March 3, 1931. B. F. BAKER 1,795,069
PACKING FOR ROTATABLE MEMBERS
Filed Jan. 2, 1926
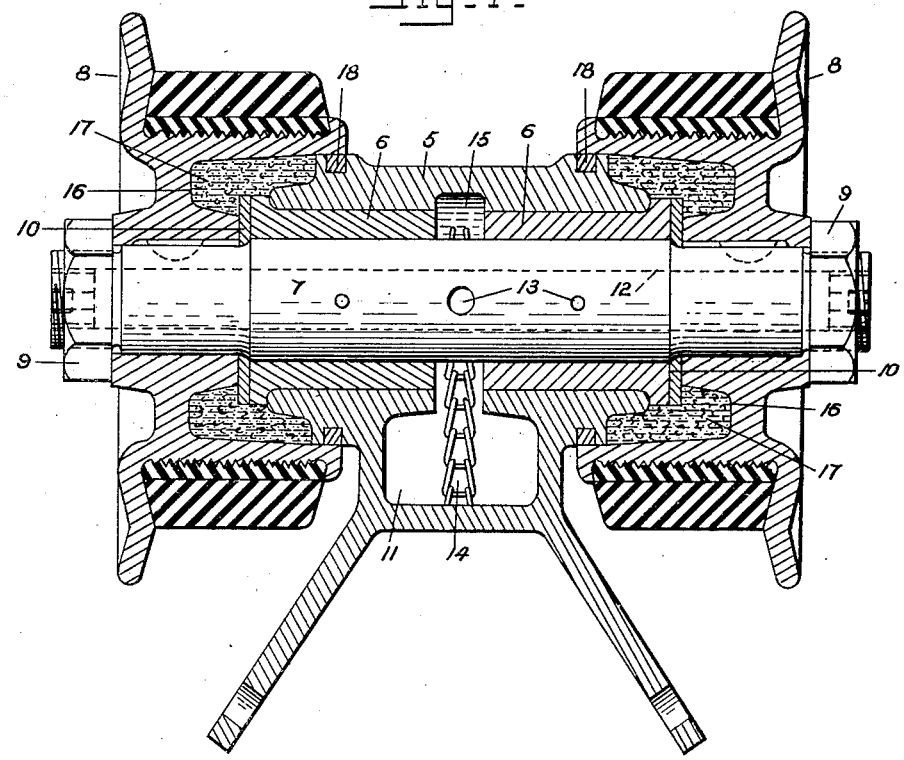
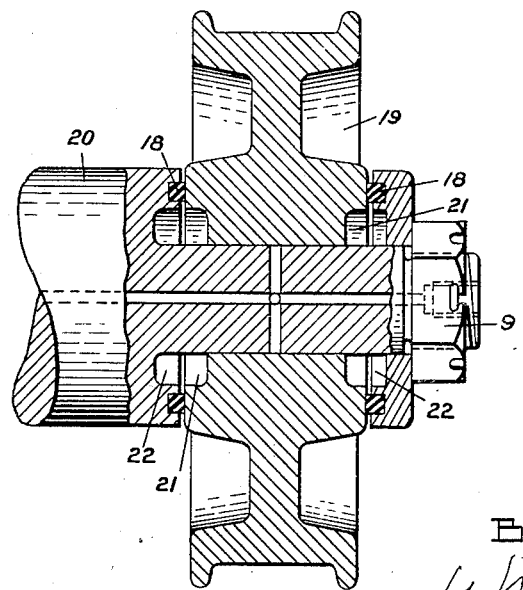
Inventor
Bertie F. Baker
By W. M. Roach
Attorney Patented Mar. 3, 1931

1,795,069

UNITED STATES PATENT OFFICE

BERTIE F. BAKER, OF DAVENPORT, IOWA

PACKING FOR ROTATABLE MEMBERS

Application filed January 2, 1926. Serial No. 79,020.

(GRANTED UNDER THE ACT OF MARCH 3, 1883, AS AMENDED APRIL 30, 1928; 370 O. G. 757)

The invention described herein, may be manufactured and used by or for the Government for governmental purposes without the payment to me of any royalty thereon.

This invention relates to a packing for rotatable members.

When operating wheels or rollers under conditions where the bearing surface is apt to become fouled with dust, mud, water, or the like, provision must be made to effectually exclude these elements and to confine the lubricating medium to the bearing. Examples of such conditions under which wheels may be employed are the track and track supporting rollers of track laying vehicles and the wheels in cement making machinery.

The principal object of this invention is to provide a packing for rotatable members which consists essentially in establishing a grease seal between the rotatable member and its mount.

To these and other ends, my invention consists in the construction, arrangement, and combination of elements, described hereinafter and pointed out in the claim forming a part of this specification.

A practical embodiment of the invention is illustrated in the accompanying drawings, wherein:

Fig. 1 is a transverse sectional view of one form of track supporting roller showing the manner of establishing the packing when the rotatable member is within the stationary member; and Fig. 2 is a fragmentary transverse sectional view through another form of wheel or roller in which the wheel is mounted on the stationary member.

Referring to the drawings by numerals of reference:

In Fig. 1 there is shown a track supporting roller of the split or divided type consisting of a stationary housing 5, equipped with spaced bushings 6 within which is rotatably mounted an axle 7 carrying a pair of wheels 8—8 held by the nuts 9 against thrust washers 10.

The housing is formed with an oil reservoir 11 which may be filled by admitting the oil through the axle which is provided with the necessary passage 12 and ducts 13—13. The oil is supplied to the bearings by means of a chain 14, or similar device, secured centrally to the axle between the spaced bushings and during rotation of the axle adapted to wrap itself thereabout after dipping into the reservoir. The housing may be formed with an internal grooove 15 to provide clearance for the chain.

The housing and wheel are so formed as to provide an annular space 16 between their end faces, which space is packed with a heavy grease 17 admitted in any suitable manner to establish a seal for confining the lubricant to the bearing and preventing the incursion of dust, mud, water, etc.

A packing ring 18 carried by the housing is provided exteriorly of the grease seal to prevent escape of the grease.

In the structure shown in Fig. 2 the rotatable member or wheel 19 is mounted on the spindle of the stationary axle 20. The annular space for establishing the grease seal may be formed by recessing either the hub as at 21 or the stationary member as at 22, or both members may be recessed.

While in the foregoing there has been illustrated and described such combination and arrangement of elements as constitute the preferred embodiment of my invention, it is nevertheless desired to emphasize the fact that interpretation of the invention should only be conclusive when made in the light of the subjoined claim.

I claim:

A bearing member, a rotatable member carried thereby, said members formed with annular recesses in their end faces cooperating to establish an annular chamber, a grease medium in the chamber and a packing ring carried by one of the members, and encircling the chamber.

BERTIE F. BAKER.